(12) United States Patent
Mochizuki

(10) Patent No.: US 7,553,053 B2
(45) Date of Patent: Jun. 30, 2009

(54) VEHICLE LAMP AND METHOD OF MANUFACTURING VEHICLE LENS

(75) Inventor: Mitsuyuki Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 511 days.

(21) Appl. No.: 11/220,694

(22) Filed: Sep. 8, 2005

(65) Prior Publication Data

US 2006/0050521 A1    Mar. 9, 2006

(30) Foreign Application Priority Data

Sep. 9, 2004    (JP)    ............................. 2004-262504

(51) Int. Cl.
*F21V 33/00*    (2006.01)

(52) U.S. Cl. ...................... 362/509; 362/507; 362/457; 219/220

(58) Field of Classification Search ................. 362/455, 362/457, 487, 503, 507, 509, 538, 549; 219/202, 219/220, 522; 427/108, 118, 162
See application file for complete search history.

(56) References Cited

U.S. PATENT DOCUMENTS

| 4,728,775 | A | * | 3/1988 | Van Straten ................. 219/202 |
| 4,743,741 | A | * | 5/1988 | Ramus ....................... 427/108 |
| 6,233,818 | B1 | * | 5/2001 | Finn et al. .................... 29/843 |
| 6,563,086 | B1 | * | 5/2003 | Meirndorf et al. ........... 219/220 |
| 7,265,322 | B2 | * | 9/2007 | Aengenheyster et al. .... 219/522 |
| 7,410,267 | B2 | * | 8/2008 | Mochizuki .................. 219/202 |
| 2006/0011598 | A1 | * | 1/2006 | Yasuda ....................... 219/220 |

FOREIGN PATENT DOCUMENTS

| JP | 10-109587 A | 4/1998 |
| JP | 3190345 B2 | 7/2001 |

* cited by examiner

*Primary Examiner*—Y My Quach Lee
(74) *Attorney, Agent, or Firm*—Sughrue Mion, PLLC

(57) ABSTRACT

A vehicle lamp is provided with a lens and a metal wire for a heater. The metal wire is embedded in the lens by thermal wiring. A coating layer is formed on a side of the lens to which the metal wire is distributed.

16 Claims, 6 Drawing Sheets

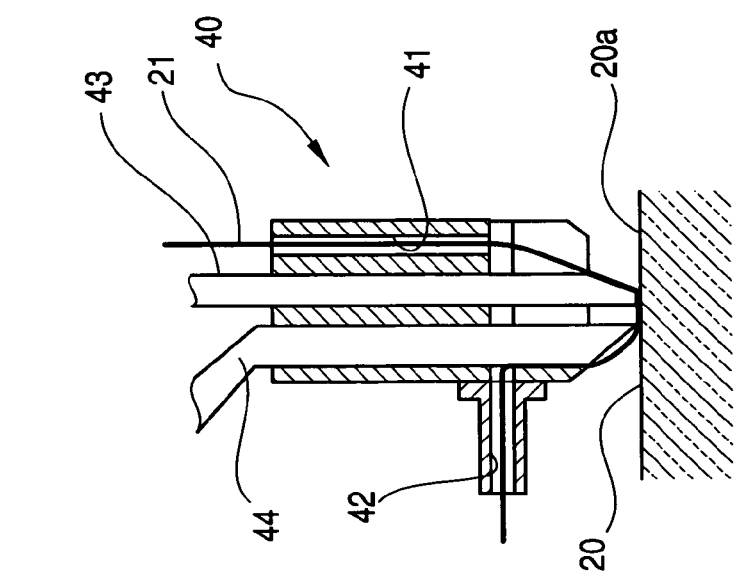
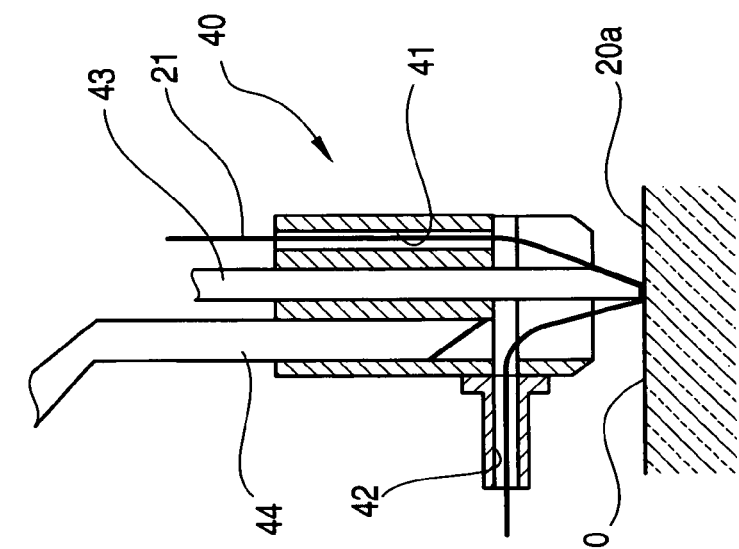
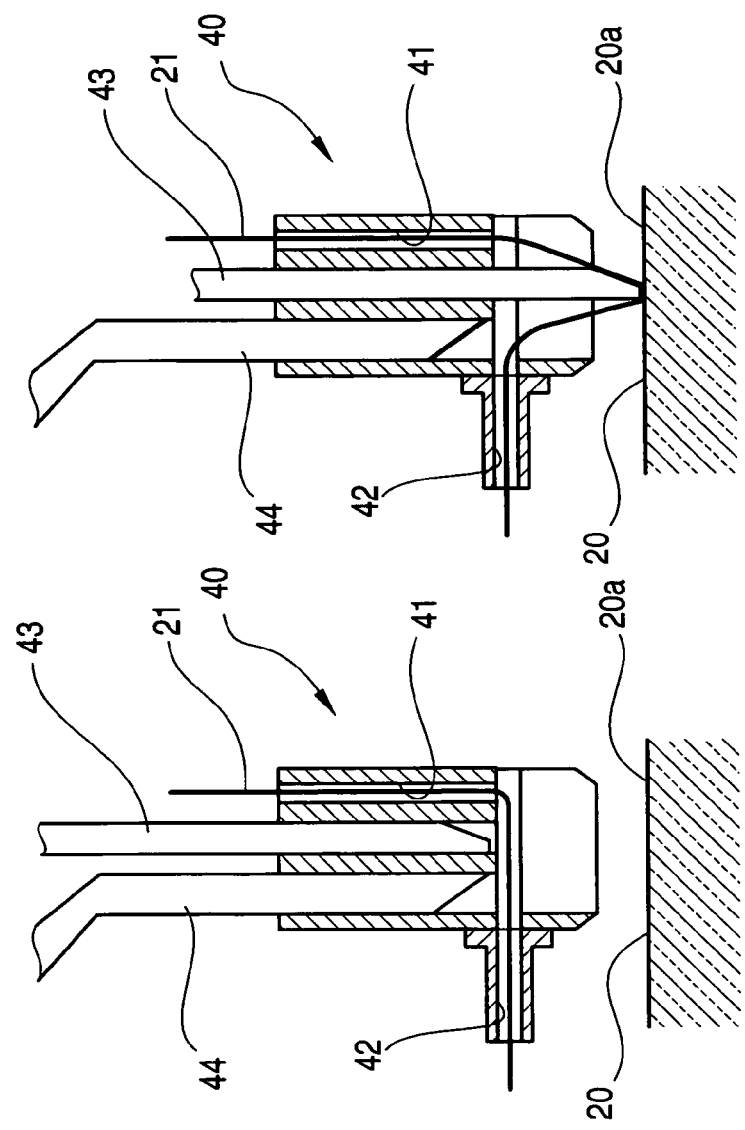

VEHICLE LAMP AND METHOD OF MANUFACTURING VEHICLE LENS

The present application claims foreign priority based on Japanese Patent Application No. P.2004-262504, filed on Sep. 9, 2004, the contents of which are incorporated herein by reference.

BACKGROUND OF THE INVENTION

1. Field of the Invention

The present invention relates to a vehicle lamp and a manufacturing method of the vehicle lamp. More particularly, the present invention relates to a vehicle lamp provided with a lens incorporating a heater and to a manufacturing method of facilitating a production of a vehicle lamp that has an improved appearance.

2. Related Art

There is a method for melting snow sticking to lens of vehicle lamp and clearing the fogginess, by applying current in a metal wire crawled on the lens so as to generate heat.

However, the metal wire is hardly securable to the lens even though the metal wire is crawled. Moreover, the metal wire on the lens affects to light distribution of the lamp.

SUMMARY OF THE INVENTION

One or more embodiments of the present invention provide a method for facilitating a production of a vehicle lamp having a lens with a heater and an improved appearance.

In accordance with one or more embodiments of the present invention, a vehicle lamp is manufactured by: thermally wiring a metal wire on a lens; and coating the lens on a side where the metal wire is provided.

In accordance with one or more embodiments of the present invention, the metal wire is used as a heater.

Therefore, it is easy to incorporate the heater into the lens with the improved appearance of the lens. Moreover, the metal wire is easy wired in the lens, wherein the appearance of the lens is not deteriorated; and light distribution is less affected by the distribution of the metal wire.

In accordance with one or more embodiments of the present invention, the thermal wiring is conducted by applying ultrasonic waves.

Therefore, it is possible to simplify a wiring machine as well as shorten a manufacturing time for wiring work.

In accordance with one or more embodiments of the present invention, a method for manufacturing the vehicle lens is further provided with: securing a terminal to the lens; and connecting an end portion of the metal wire to the terminal.

Therefore, since the end portion of the metal wire are connected to the terminal fixed to the lens, electric power is easy supplied to the metal wire distributed in the lens by means of simplified structure.

Further, in accordance with one or more embodiments of the present invention, a vehicle lamp is provided with: a lens; a metal wire embedded in the lens; and a coating layer on a side of the lens where the metal wire is provided.

In accordance with one or more embodiments of the present invention, the metal wire is used as a heater, and the metal wire is embedded in the lens by thermal wiring.

Therefore, it is easy to incorporate the heater into the lens with the improved appearance of the lens. Moreover, the metal wire is easy wired in the lens, wherein the appearance of the lens is not deteriorated; and light distribution is less affected by the distribution of the metal wire.

In accordance with one or more embodiments of the present invention, the thermal wiring is conducted by ultrasonic wiring.

Therefore, it is possible to simplify a wiring machine as well as shorten a manufacturing time for wiring work.

In accordance with one or more embodiments of the present invention, the vehicle lamp is further provided with a terminal secured to the lens, wherein an end portion of the metal wire is connected to the terminal.

Therefore, since the end portion of the metal wire are connected to the terminal fixed to the lens, electric power is easy supplied to the metal wire distributed in the lens by means of simplified structure.

In accordance with one or more embodiments of the present invention, the metal wire is provided on an inside of the lens.

In accordance with one or more embodiments of the present invention, the coating layer is made of a transparent resin.

In accordance with one or more embodiments of the present invention, the metal wire is disposed between the lens and the coating layer.

Other aspects and advantages of the invention will be apparent from the following description and the appended claims.

BRIEF DESCRIPTION OF THE DRAWINGS

FIG. 3A is a simplified view of an example of a wiring head for doing the wiring of a metal wire, showing a standby condition before the wiring is done.

FIG. 3B is a simplified view of the example of the wiring head for doing the wiring of a metal wire, showing a condition during the wiring work.

FIG. 3C is a simplified view of the example of the wiring head for doing the wiring of a metal wire, showing a condition at the termination of the wiring.

DESCRIPTION OF THE PREFERRED EMBODIMENTS

Embodiments of the invention will be described with reference to the accompanying drawings.

Figure 1A:
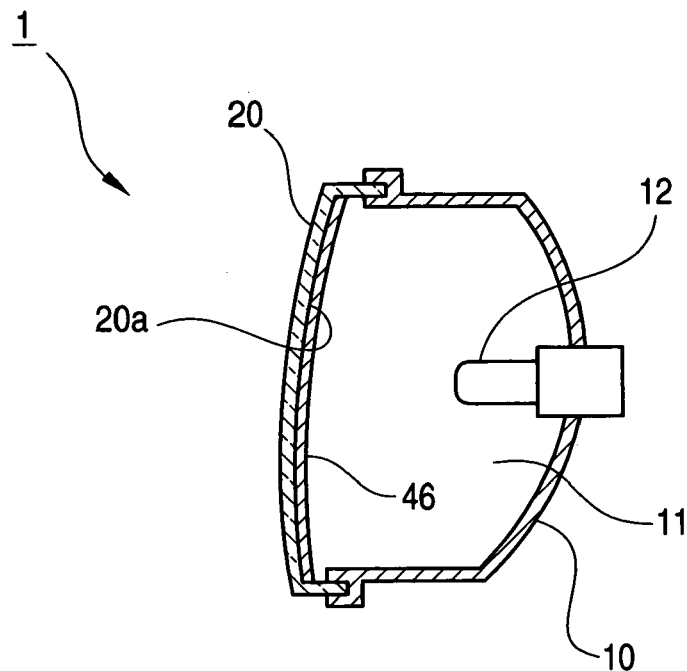
FIG. 1A is a vertical sectional view of a vehicle lamp embodying the invention.
Figure 1B:
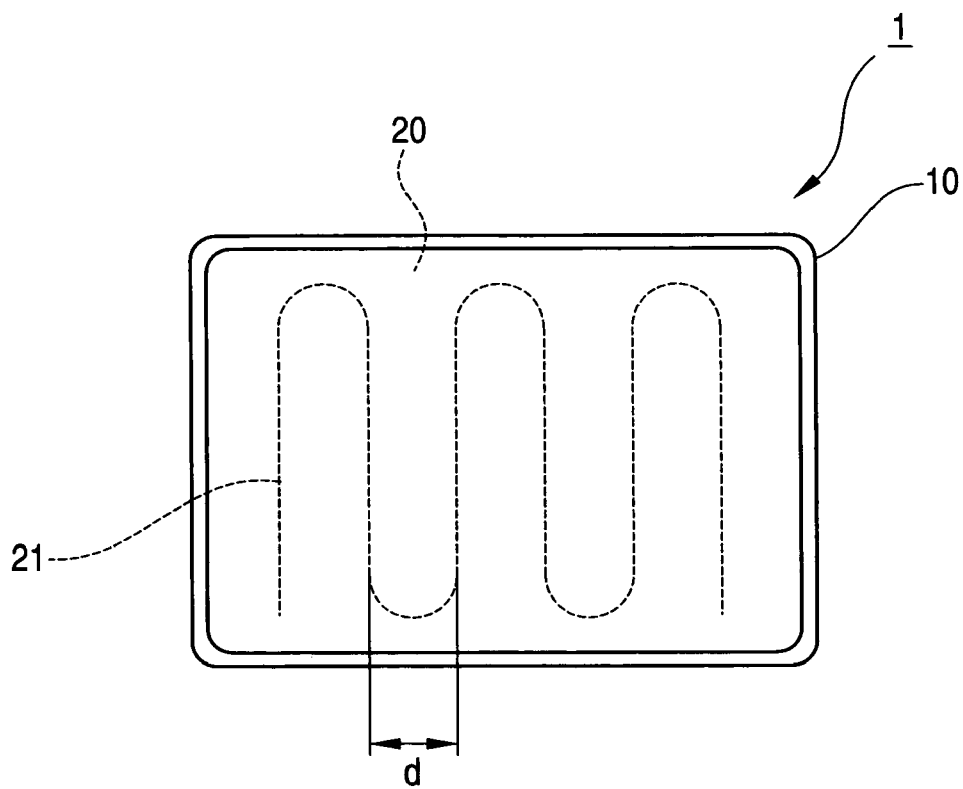
FIG. 1B is an elevational view of the vehicle lamp above.

FIG. 1A and 1B show an example of a vehicle lamp to which an embodiment of the present invention is applied.

A vehicle lamp 1, which is an automotive headlamp, for example, is formed with a lamp body 10 having a concave portion opening forward, a front opening of the lamp body 10 being covered with a lens 20; and a lamp chamber 11 sectioned by the lamp body 10 and the lens 20. A light source bulb 12 is disposed in the lamp chamber 11. The light source bulb 12 is a discharge bulb but it may be a light source bulb other than the discharge bulb, such an incandescent lamp as a halogen lamp. Otherwise, a light-emitting diode may also be used as a light source.

A metal wire 21, for example, a copper wire, which generates heat when energized, is fixed to an inside of the lens 20. It is preferable for the metal wire 21 to have a diameter of 0.05 mm-0.2 mm with a distance d ranging from 5 mm-25 mm between the adjoining metal wires. If the diameter of the metal wire 21 is too small, there is an increasing danger of disconnection, whereas if it is too large, light distribution will be affected because beams of light passing through the lens are obstructed thereby and moreover the appearance of the lens will be deteriorated because the metal wire 21 becomes conspicuous. If the metal wire-to-wire distance d is too short, moreover, light distribution will also be affected thereby, whereas if the distance d is too long, a desired quantity of heat will become unobtainable.

In the vehicle lamp 1, the metal wire 21 generates heat when the metal wire 21 fixed to the lens 20 is energized, whereby the temperature of the portion where the metal wire 21 is distributed in the lens 20 rises. Thus, snow sticking to the surface of the lens 20 is melted, so that the fogginess generated on the inside and outside of the lens 20 is cleared.

A description will now be given of a means for wiring the metal wire 21 on the inside of the lens 20 and then fixing the metal wire 21 thus wired to the lens 20.

Figure 2:
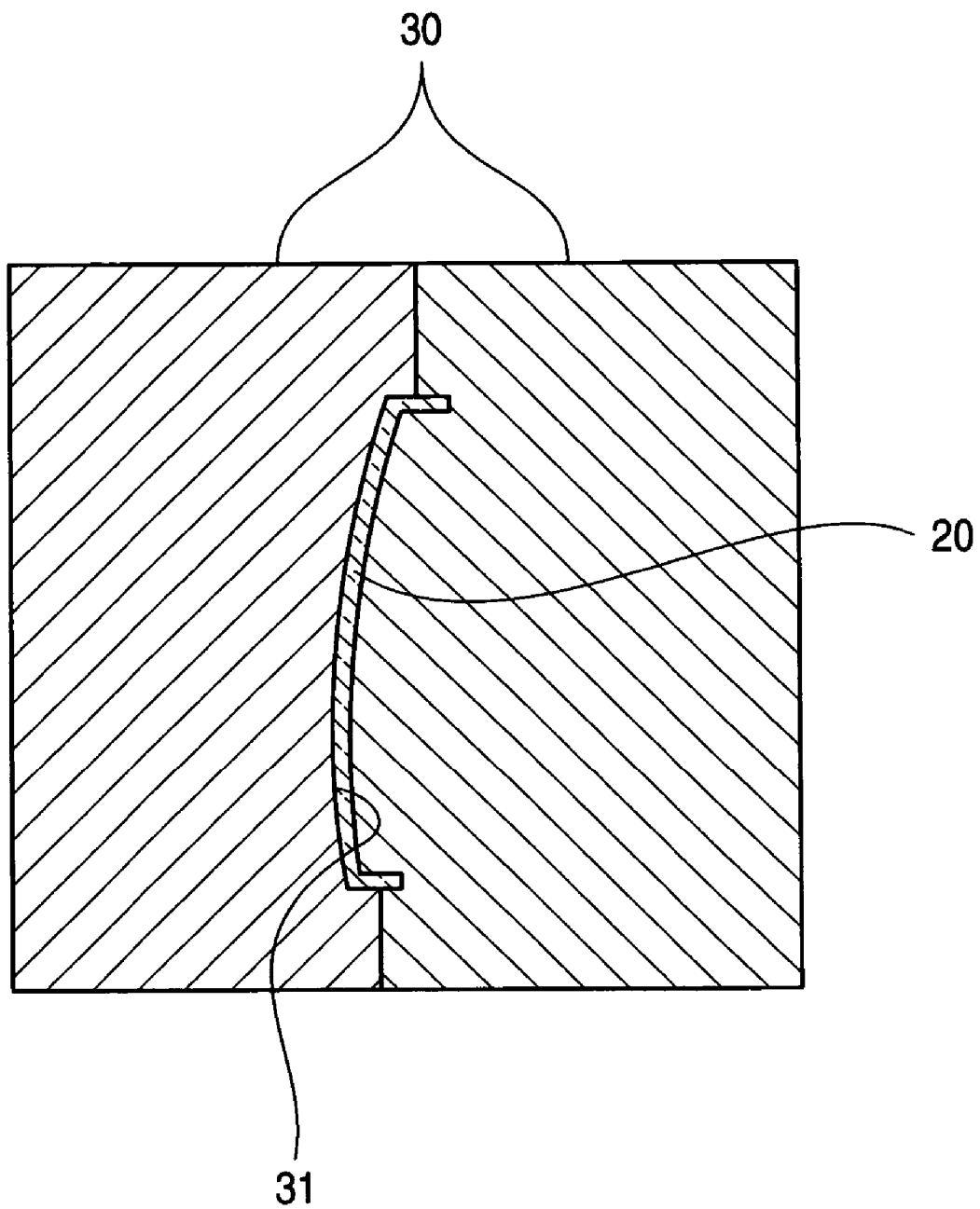
FIG. 2 is a schematic sectional view of a lens injection molding process.

The lens 20 is molded by injection molding first (see FIG. 2). More specifically, the lens 20 is molded by injecting a thermoplastic resin material into a cavity 31 formed by clamping a metal mold 30. As the resin material for the lens 20, use can be made of polycarbonate and acrylic resin.

The metal wire 21 is thermally wired on the inside 20a of the lens 20 thus injection-molded. The thermal wiring in this case refers to the work of heat-softening a base material (the lens 20 in this case) to be wired with the metal wire 21 by adding heat to the material and embedding the metal wire 21 partially at least in the heat-softened material by applying pressure to the metal wire 21. As a means for applying heat to the base material, for example, it is configured applying ultrasonic vibrations to the base material or to press a heated member against the base material.

Figure 4:
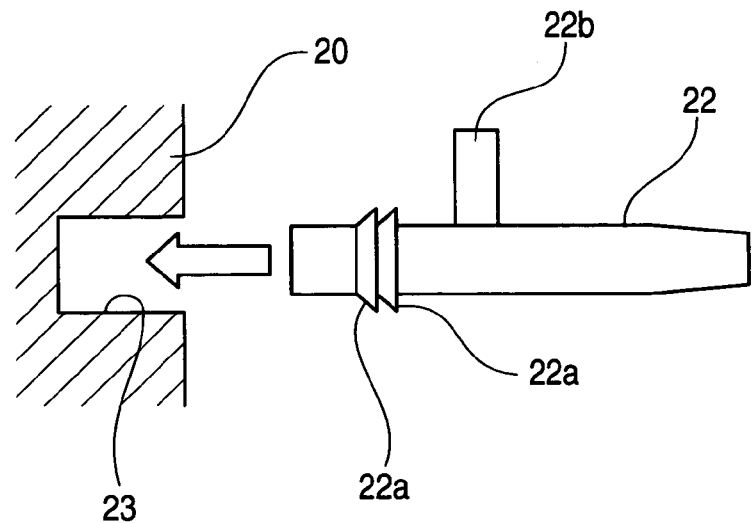
FIG. 4 is a diagram showing a terminal to be secured to a lens, the terminal being shown separately from the lens.

Reference numeral 40 in FIGS. 3A to 3C denote a simplified wiring head for thermal wiring. In the condition shown in FIG. 3A first, the metal wire 21 is passed through guide portions 41 and 42 such that it draws a substantially L-shaped path. From the condition shown in FIG. 3A, a wire leg 43 is projected as shown in FIG. 3B. Accordingly, the metal wire 21 is pulled out by the front end of the wire leg 43 before being drawn further from the guide portion 41, so that a V-shaped portion is formed in the horizontal portion of the L-shaped path. Then, the front end of the wire leg 43 is pressed against the base material (lens 20). Thus, the front end of the V-shaped portion of the metal wire 21 is held onto the inside 20a of the lens 20. Consequently, the front end portion of the wire leg 43 is heated or ultrasonic vibrations are given to the wire leg 43, whereby the portion that the wire leg 43 on the inside 20a of the lens 20 contacts (directly or via the metal wire 21) is heat-softened. Therefore, while adequate pressure is applied to the wire leg 43 in the direction of the inside 20a of the lens 20, the metal wire 21 is pressed by the wire leg 43 and forced into the lens 20 softened by heating (see FIG. 4).

With the wire leg 43 heated or the ultrasonic vibrations added then, the wiring head 40 is kept running through the desired path with the adequate pressure applied in the direction of the inside 20a of the lens 20, whereupon the metal wire 21 is embedded in the inside 20a of the lens 20 along the path above.

When the wiring head 40 is made to run up to the end of a wiring region, the metal wire 21 is cut by projecting the front end of a cutter 44 as shown in FIG. 3C.

Figure 5:
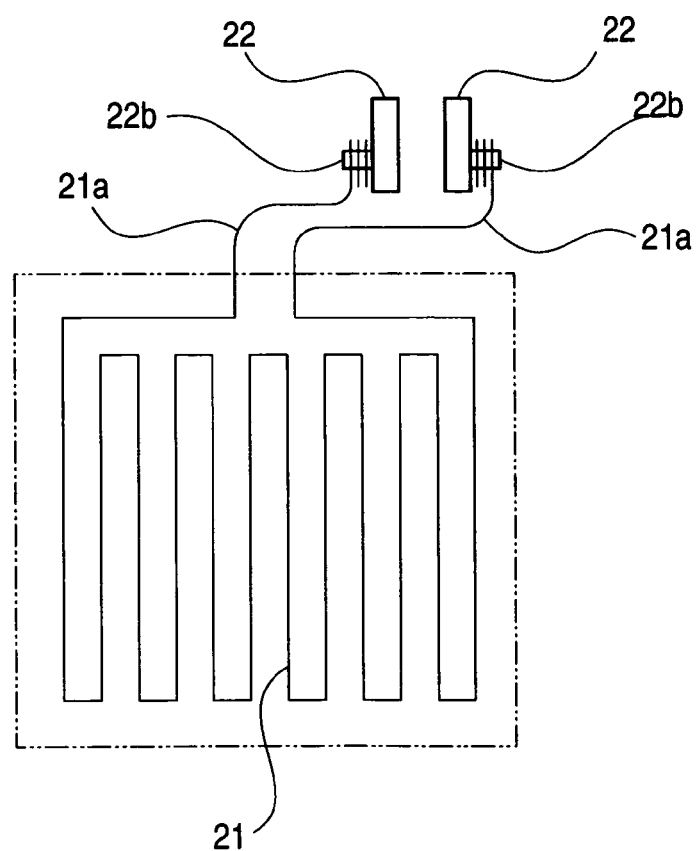
FIG. 5 is a diagram showing an example of a wiring pattern of the metal wire.

Upon the completion of distributing the metal wire 21 to the lens 20, both ends of the metal wire 21 are connected to the respective terminals 22 fixed to the lens 20 beforehand. Although the metal wire 21 may be connected to the terminal 22 by any proper method such as welding or tying, only tying the metal wire can simplify the work. The terminal 22 may be fixed to the lens 20 by any proper method such as insert molding or press fitting. There is a method applicable to fixing the terminal 22 to the lens 20 by forming safety-lock projections 22a, 22a, . . . in the base end portion of the terminal 22, for example, whereby to press-fit the base end portion into a hole 23 formed in the lens 20 (see FIG. 4), by embedding a base end portion having safety-lock projections 22a, 22a, . . . in the lens 20 by insert molding, or the like. Further, the end portion of the metal wire 21 is tied around a projection 22b protruding from the mid-portion of the terminal 22. As shown in a schematic wiring pattern of FIG. 5, for example, the metal wire 21 is embedded within the range of being surrounded with a chain double-dashed line, whereas metal wires 21a and 21a positioned outside the range of being surrounded with the chain double-dashed line are kept in a condition separated (floated) from the lens 20, so that the end portions of the metal wires 21a and 21a are tied around the projections 22b and 22b of the respective terminals 22 and 22.

Figure 6:
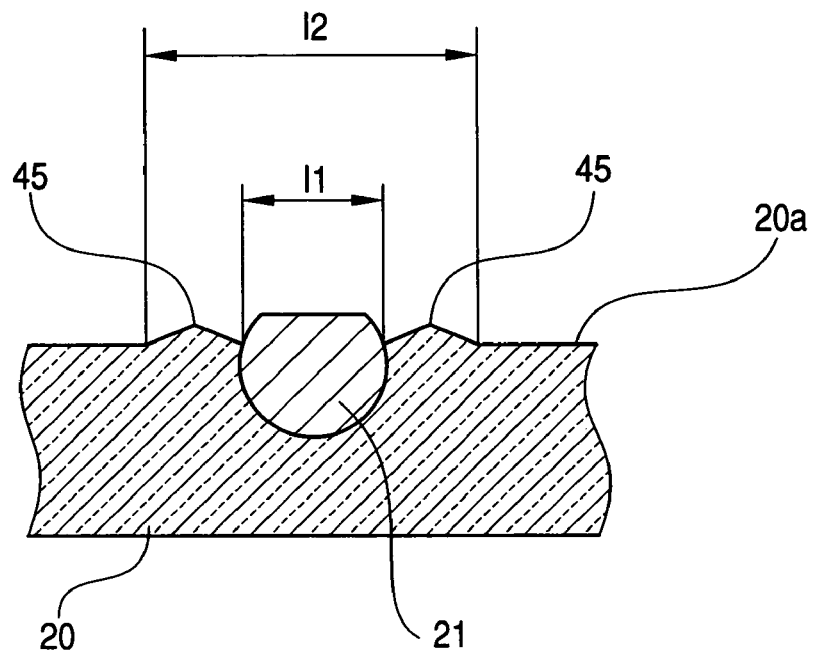
FIG. 6 is an enlarged sectional view of the state of the metal wire partially embedded in the lens by the wiring.

Although the wiring of the metal wire 21 to the lens 20 is done as described above, only substantially half the metal wire 21 can be embedded in the lens 20 as shown in FIG. 6 when it is attempted only to bury the metal wire 21 in the lens 20 and moreover the resin material pushed aside by burying the metal wire 21 tends to become protruded in the form of a bank along the metal wire 21. As the end-to-end width 12 between the bank-like protruded portions 45 and 45 naturally becomes larger than the diameter 11 of the metal wire 21, the appearance of the lens 20 is deteriorated. Moreover, since the bank-like protruded portions 45 and 45 function as prisms with respect to beams of light, the problem is that light distribution is disturbed because of irregular refraction in the above bank-like protruded portions 45 and 45.

Figure 7:
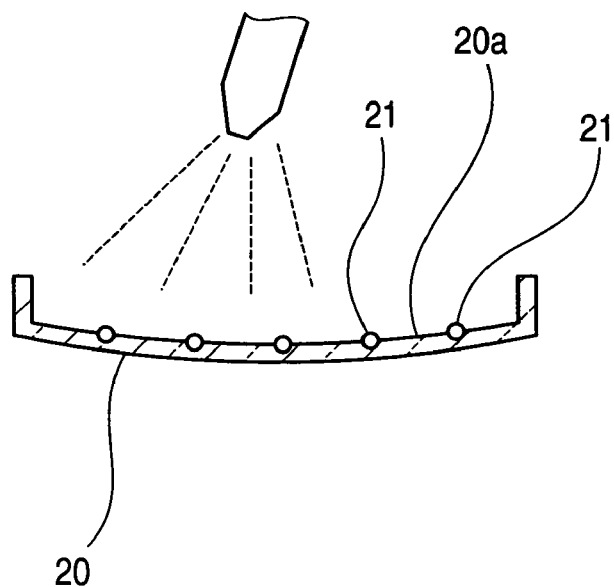
FIG. 7 is a schematic diagram showing the coating.
Figure 8:
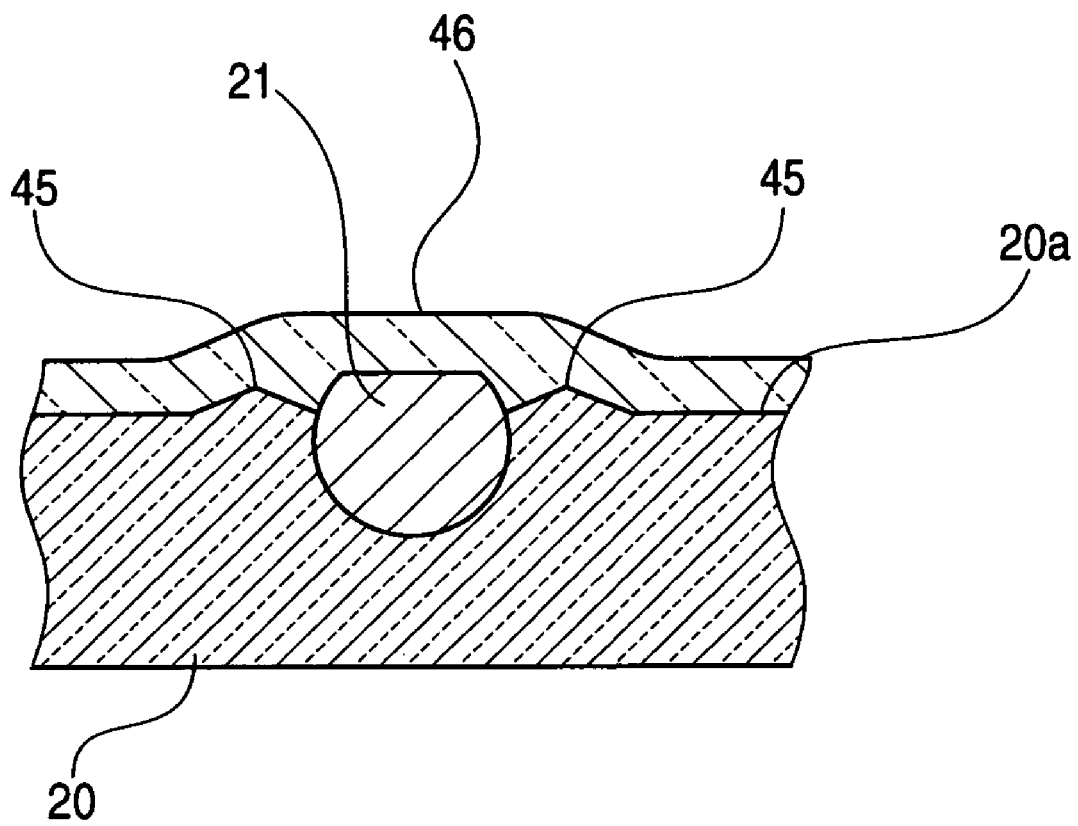
FIG. 8 is an enlarged sectional view of the principal part on the termination of the coating.

According to the embodiment of the present invention, a coating layer 46 of transparent resin is formed by coating on the inside 20a of the lens 20 after wiring is done by the wiring head 40 as described above (see FIGS. 7 and 8). With the formation of the coating layer 46, the metal wire 21 becomes completely held between the lens 20 and the coating layer 46. As the metal wire 21 is hardly allowed to fall away from the lens 20 with the metal wire 21 cut off the air, the metal wire 21 is prevented from not only discoloration due to oxidation but also a change in electrical characteristics such a change in resistance value. Further, the formation of the transparent coating layer 46 makes smooth the lens side where the metal wire 21 is embedded (see FIG. 8) and any portion other than the metal wire 21, for example, the bank-like protruded portions 45 and 45 become less conspicuous, whereby the appearance of the lens is improved. With the formation of the resin coating layer 46 whose refractive index closely approximates that of the lens 20, the refraction of light through the bank-like protruded portions 45 and 45 can almost be eliminated and so does the bad influence of light distribution. As long as the projections 22b and 22b of the terminals 22 and 22 are completely coated with the coating resin, the end portions of the metal wire 21 tied around the terminals 22 and 22 are never allowed to come off the respective terminals 22 and 22.

As the lens 20 thus wired with the metal wire 21 is formed as set forth above, the lens 20 is fitted to the lamp body 10 and a power supply cord is connected to the terminals 22 and 22 projected from the inside of the lens 20 by a proper means so that power can properly be supplied to the metal wire 21.

Therefore, in the manufacture of vehicle lamp having a fogginess-clearing function as well as a snow-melting function in cold districts, it is possible to readily wire a metal wire to a lens, whereby not only the appearance but also the function of the lens thus completed is ascertained satisfying.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A method of manufacturing a vehicle lamp comprising:
    thermally wiring a metal wire onto a lens; and
    coating the lens with a transparent resin on a side where the metal wire is provided;
    wherein the metal wire is embedded in the lens so that banked protruded portions are formed at sides of the metal wire; and
    wherein a refractive index of the transparent resin closely approximates a refractive index of the lens.

2. The method according to claim 1, wherein the metal wire is used as a heater.

3. The method according to claim 1, wherein the thermal wiring is conducted by applying ultrasonic waves.

4. The method according to claim 1, further comprising:
    securing a terminal to the lens; and
    connecting an end portion of the metal wire to the terminal.

5. The method according to claim 4, wherein the terminal is not part of the metal wire.

6. The method according to claim 1, wherein the coating layer completely embeds the wire by being provided in contact with the metal wire and portions of the lens adjacent to the wire.

7. The method according to claim 1, wherein the thermally wiring a metal wire onto the lens involves heat-softening the lens to be wired with the metal wire, and embedding the metal wire at least partially in the heat-softened lens by applying pressure to the metal wire.

8. The method according to claim 7, wherein the heat-softening is performed by applying ultrasonic waves.

9. The method according to claim 1, wherein the metal wire is wired onto the lens in a snakelike pattern.

10. A vehicle lamp comprising:
    a lens;
    a metal wire embedded in the lens so that banked protruded portions are formed at sides of the metal wire; and
    a coating layer of transparent resin on a side of the lens where the metal wire is provided;
    wherein a refractive index of the transparent resin closely approximates a refractive index of the lens.

11. The vehicle lamp according to claim 10, wherein the metal wire is used as a heater, and
    the metal wire is embedded in the lens by thermal wiring.

12. The vehicle lamp according to claim 11, wherein the thermal wiring is conducted by ultrasonic wiring.

13. The vehicle lamp according to claim 10, further comprising:
    a terminal secured to the lens, wherein an end portion of the metal wire is connected to the terminal.

14. The vehicle lamp according to claim 10, wherein the metal wire is provided on an inside of the lens.

15. The vehicle lamp according to claim 10, wherein the metal wire is disposed between the lens and the coating layer.

16. The vehicle lamp according to claim 10, wherein the coating layer covers at least the metal wire to make smooth a surface of the lens where the metal wire is embedded.

* * * * *